(12) United States Patent
Chen (10) Patent No.: US 12,025,481 B2
(45) Date of Patent: Jul. 2, 2024

(54) DEVICE FOR MEASURING MASS FLOW RATE OF MULTIPHASE FLOW BASED ON RAY COINCIDENCE MEASUREMENT

(71) Applicant: Sea Pioneers Technologies Co., Ltd., Wuxi (CN)

(72) Inventor: Jige Chen, Wuxi (CN)

(73) Assignee: SEA PIONEERS TECHNOLOGIES CO., LTD., Wuxi (CN)

( * ) Notice: Subject to any disclaimer, the term of this patent is extended or adjusted under 35 U.S.C. 154(b) by 431 days.

(21) Appl. No.: 17/361,432

(22) Filed: Jun. 29, 2021

(65) Prior Publication Data

US 2021/0325220 A1    Oct. 21, 2021

Related U.S. Application Data

(63) Continuation-in-part of application No. PCT/CN2019/080006, filed on Mar. 28, 2019.

(30) Foreign Application Priority Data

Dec. 29, 2018   (CN) .......................... 201811639597.9

(51) Int. Cl.
| | | |
|---|---|---|
| G01F 1/74 | (2006.01) |
| G01F 1/36 | (2006.01) |
| G01F 1/712 | (2006.01) |
| G01F 1/86 | (2006.01) |
| G01F 1/88 | (2006.01) |
| G01F 7/00 | (2006.01) |
| G01F 15/08 | (2006.01) |

(52) U.S. Cl.
CPC .................. *G01F 1/74* (2013.01); *G01F 1/36* (2013.01); *G01F 1/712* (2013.01); *G01F 1/86* (2013.01); *G01F 1/88* (2013.01); *G01F 7/005* (2013.01); *G01F 15/08* (2013.01)

(58) Field of Classification Search
CPC ... G01F 1/74; G01F 1/88; G01F 7/005; G01F 15/08; G01F 1/36; G01F 1/86; G01F 1/712
USPC ....................................... 73/861.04
See application file for complete search history.

(56) References Cited

U.S. PATENT DOCUMENTS 7,633,057 B2 * 12/2009 Cooke ..................... G01T 1/202
                                                              250/252.1
2021/0325220 A1 * 10/2021 Chen ...................... G01F 7/005

FOREIGN PATENT DOCUMENTS

| CN | 101292174 A | * | 10/2008 | ........... G01T 1/1644 |
| CN | 102087298 A | * | 6/2011  | ............. G01N 23/12 |
| CN | 102565844 A | * | 7/2012  | ........... G01N 23/046 |

(Continued)

*Primary Examiner* — Stephanie E Bloss
*Assistant Examiner* — Kevin C Butler
(74) *Attorney, Agent, or Firm* — MATTHIAS SCHOLL P.C.; Matthias Scholl (57) ABSTRACT

A device for measuring a mass flow rate of a multiphase flow based on ray coincidence measurement includes a support frame and a plurality of ray detection assemblies. The support frame includes a central through hole and an outer wall, and the central through hole is configured to receive a fluid pipe. The plurality of ray detection assemblies is distributed along the circumferential direction of the outer wall and is perpendicular to the axis of the central through hole. The plurality of ray detection assemblies each includes a scintillation crystal and a detector, and the scintillation crystal is disposed between the outer wall and the detector.

10 Claims, 4 Drawing Sheets

(56) References Cited

FOREIGN PATENT DOCUMENTS

| CN | 105769230 | A | * | 7/2016 | ............... A61B 6/03 |
| CN | 106950587 | A | * | 7/2017 | |
| CN | 109443466 | A | * | 3/2019 | ............... G01F 1/86 |
| CN | 109489752 | A | * | 3/2019 | ............... G01F 1/74 |
| CN | 109507715 | A | * | 3/2019 | ............. G01N 23/12 |
| CN | 209166558 | | * | 7/2019 | ............... G01F 1/86 |
| EP | 2927650 | A1 | * | 10/2015 | ............... G01F 1/74 |
| JP | 2012058154 | A | * | 3/2012 | ......... C09K 11/7773 |
| JP | 2023515257 | A | * | 4/2023 | ............... A61N 5/10 |
| RU | 2533758 | C2 | * | 11/2014 | ............. G01F 1/704 |

\* cited by examiner

DEVICE FOR MEASURING MASS FLOW RATE OF MULTIPHASE FLOW BASED ON RAY COINCIDENCE MEASUREMENT

CROSS-REFERENCE TO RELATED APPLICATIONS

This application is a continuation-in-part of International Patent Application No. PCT/CN2019/080006 with an international filing date of Mar. 28, 2019, designating the United States, now pending, and further claims foreign priority benefits to Chinese Patent Application No. 201811639597.9 filed Dec. 29, 2018. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND

The disclosure relates to the field of multiphase fluids, and more particularly to a device for measuring a mass flow rate of a multiphase flow based on ray coincidence measurement.

The phase refers to one of the distinct forms in which matter can exist with the same composition and the same physical and chemical properties in a system, and there is an obvious separable interface between the phases. Multiphase fluid is a common fluid form in the industrial production. It is composed of two or more phases with obvious interfaces, including gas/liquid, liquid/solid, gas/solid, liquid/liquid two-phase flow, as well as gas/liquid/liquid, gas/liquid/solid multiphase flow, etc. There are a large number of two-phase flow and multiphase flow measurement problems in industrial processes, life sciences, and nature, etc., for example, the gas-solid two-phase flow in the pulverized coal transmission process of thermal power equipment and the pneumatic conveying device of grain processing, the gas-liquid two-phase flow in the production processes of industrial boiler systems and oil wells, the liquid-solid two-phase flow in the extraction of sediments in the offshore oil industry and the pulp flow process in the paper industry, as well as the liquid-liquid two-phase flow of water and petroleum in oil pipelines in petroleum production, and various two-phase fluids in the transportation of two substances in metallurgical or chemical engineering.

These two-phase flows seem to be simple, but the law of motion thereof is complicated. Accurately and timely understanding various movement parameters of the two-phase fluid is of important practical significance to the design of industrial equipment, the accurate measurement of raw materials, and the control of production safety and efficiency, etc. For example, in a thermal power plant, when the burner injects the pulverized coal and air into the furnace simultaneously, the ratio of pulverized coal to air directly determines the power generation efficiency of coal; in an oil extraction device, the crude oil together with the natural gas are extracted into the oil pipeline and the oil content and gas content are measured, which is of great significance for guiding petroleum production; in the chemical and metallurgical industries, the transportation and proportioning of raw materials require accurate measurement, which is very important for the economical production and safe production.

Compared with a single-phase flow, the two-phase flow or multiphase flow is complicated in flow characteristics and has interfacial effects and relative speeds between phases, and there are many distribution parameters that need to be detected in the multi-phase fluid, which increases the difficulties of parameter detection. Traditional multiphase flow parameter detection is mainly completed by a phase separation method and manual assay method. The phase separation method requires large-scale separation equipment. After a period of standing, the multiphase fluid is separated into single-phase fluids mainly by gravity, and then a single-phase flow meter is used for measurement. The phase separation method is simple and reliable, and the measurement results are not affected by factors such as flow pattern changes. However, the required separation equipment is bulky and expensive, and is incapable of real-time online detection. For the manual assay method, the sampling is made in local points and the information of local points is used to replace the form of the entire fluid flow, which has great randomness and cannot accurately reflect the phase-separate flow of the fluid.

The main purpose of applying ray technology to industrial two-phase flow detection is to measure the mass fraction of two-phase flow and identify the flow pattern. The principle of ray attenuation is used to detect the phase volume fraction and flow pattern of multiphase pipe flow, without destroying the pipe structure. It is a non-invasive and non-destructive measurement technology. The basic principle is to receive the rays transmitted through the two-phase pipe flow through the detector array, and obtain a series of attenuation data (projection), and then reconstruct the images after denoising and correcting these data, to obtain the two-dimensional tomographic image of ray transmission section of two-phase pipe flow. Therefore, the technical solution has the advantages of high measurement accuracy, good imaging resolution, simple structure, and wide applicability, etc. However, in the traditional industrial imaging process using ray technology, a radiation device capable of generating a certain amount of radiation must be required, such as an X-ray tube, Cs-137 radiation source, etc. Due to the existence of the radiation device, related testing equipment must be protected and supervised, to avoid the accidents. Therefore, there are many inconveniences in the promotion and application of imaging equipment based on radiographic technology.

In the related art, a multiphase flow positron tomography device and method is disclosed. The device utilizes positron and negatron annihilation to generate a pair of compatible 511 keV energy γ-rays as a tomographic imaging method, providing on-line tomographic imaging for multiphase flow metering in oil pipelines. The device includes multiple sets of parallel high-precision gamma-ray detector arrays, positron emission sources and shields arranged in a specific spatial structure, which can obtain the phase fraction of multiphase flow mixtures such as oil, gas and water under the condition of a single radioactive source by combining with the image processing functions. The design of multiple sets of high-precision detector arrays greatly improves the accuracy of multiphase flow measurement and its applicability under different flow patterns of multiphase flow. The fluid image information it produces will greatly enrich the oil and gas measurement information in the oil and gas industry and provide basic data for more effective reservoir management and production optimization.

In the related art, the design of the positron emission source is relatively complicated, and requires protection and supervision, with high costs; in addition, the decay period (half-life) of the positron emission source is short, easy to age and needs frequent replacement to ensure its stable performances.

For γ-ray receivers, generally photomultiplier tube counters are used as counters for detecting γ-ray transmission intensity, but these counters have different degrees of temperature drift, that is, the measured γ-ray transmission intensity signal will drift with the changes in temperature of the counter itself, causing errors in the transmission intensity signal measurement. At present, technically, to eliminate this temperature drift phenomenon, wet test meters using γ-ray detection technology need to be equipped with a constant temperature device for the γ-ray receiver to maintain a constant temperature.

SUMMARY

The disclosure provides a device for measuring a mass flow rate of a multiphase flow based on ray coincidence measurement. Through the ray detection technology of the intrinsic radiation of the scintillation crystal, the radioactive sources in the ray measuring device in the related art can be eliminated, thus reducing the system cost and improving the system safety and reliability.

The disclosure provides a device for measuring a mass flow rate of a multiphase flow based on ray coincidence measurement, the device comprising a support frame and a plurality of ray detection assemblies; the support frame comprises a central through hole and an outer wall, and the central through hole is configured to receive a fluid pipe; the plurality of ray detection assemblies is distributed along the circumferential direction of the outer wall and is perpendicular to the axis of the central through hole; the plurality of ray detection assemblies each comprises a scintillation crystal and a detector, and the scintillation crystal is disposed between the outer wall and the detector.

Scintillation crystals, as a material often used in ray detection technology, are capable of converting high-energy γ-rays into low-energy visible light fluorescence, which are then detected by photoelectric converters and are converted into electrical signals. At present, commonly used scintillation crystals include sodium iodide (NaI), lutetium oxyorthosilicate (LSO), etc. Therefore, following this principle, based on the high-precision time measurement technique and the coincidence detection technique, the flight path of γ-rays, namely, the line of response, is obtained. Through a large number of lines of response, the corresponding imaging technologies such as the filter back projection technology, Ordered Subsets Expectation Maximization, etc., can be used to achieve the total cross-sectional measurement of the objects to be detected. By using the intrinsic rays of the scintillation crystal to perform total cross-section measurement, the radioactive sources in the ray measuring device can be eliminated, to reduce the system cost with small volume, and greatly improve the system safety and reliability.

In a class of this embodiment, the scintillation crystal comprises lutetium-176.

The lutetium element scintillation crystal contains Lu-176 radioactive isotope, which emits β-rays during the decay process, and the β-rays rapidly decay to produce γ-rays. Since the energy spectrum of Lu-176 is known, β-rays will be produced during the decay process, and the decay of the β-rays will produce three energy levels of γ-rays, that is, 307 keV, 202 keV, and 88 keV, respectively. Because of extremely weak penetration ability, β-rays can be detected in the locality where they are generated, while γ-rays have relatively strong penetration ability, which can penetrate the fluid to be tested and then be detected. Therefore, according to this principle, the β-ray detection position can be used as the starting point of the γ-rays. After the corresponding γ-ray passes through the fluid pipe under test, it is detected by the detector located at the corresponding position of the pipe, which is used as the destination point, thereby obtaining the flight path of the γ-rays. In addition, because the half-life of Lu-176 is $2.1 \times 10^{10}$ years, the equipment performance will not degrade caused by the aging of the radiation apparatus, which greatly improves the system stability and service life.

In a class of this embodiment, the scintillation crystal is in a sheet shape and is plastic.

The sheet-like scintillation crystal LSO has a small volume and stable performance, with low cost. However, the content of Lu-176 in the sheet-like scintillation crystal LSO is low, which reduces the number of emitted rays of the system and possibly affects the defection efficiency.

The plastic scintillation crystal LYSO has better light amplification performance, short light emission time, faster amplification, higher detection efficiency, which is easier to be detected; furthermore, the plastic scintillation crystal LYSO is not easy to deliquesce and has a longer service life.

In a class of this embodiment, the detector is a photomultiplier tube (PMT) or a silicon photomultiplier (SiPM).

The photomultiplier tube is a traditional photoelectric conversion device with extremely high sensitivity and ultra-fast time response, which can quickly and effectively convert the optical signals of the rays into electrical signals; the photomultiplier tube, together with the modular circuit, amplifies the signals and reduced the noise, outputs the signal pulses. The signals are observed by an oscilloscope, and finally the collected waveform data are stored and analyzed by a host computer.

The silicon photomultiplier is a novel detector. After the photons are absorbed, a current is generated in the SiPM and multiplied, which can output a larger current signal and can be received by the modular circuit. Its detection efficiency of γ-rays is higher and its volume is smaller.

In a class of this embodiment, the scintillation crystal and the detector are fixed to each other by a couplant.

The scintillation crystal is a high-density crystal. The surface of the detector is provided with a layer of epoxy resin. When the light is emitted from the scintillation crystal to the detector, it is emitted from an optically denser medium to an optically thinner medium. If air exists between them, total reflection easily occurs, causing light loss. Optical couplants, especially optical couplers, are transparent media with large refractive index. When couplants are disposed between the scintillation crystal and the detector, the air can be effectively eliminated and the light loss caused by total reflection can be significantly reduced. The couplant may be a silica gel to bond the scintillation crystal to the detector, effectively reducing the loss of light from the scintillation crystal to the detector and improving the photoelectric conversion efficiency.

In a class of this embodiment, every two adjacent ray detection assemblies are isolated by a metal piece.

Through the above technical solution, the metal piece is capable of preventing rays emitted by a ray detection assembly from being detected by other ray detection assemblies before passing through the fluid pipe, thereby reducing mutual interference.

In a class of this embodiment, the metal piece is a tungsten-base alloy.

The tungsten-base alloy is a high-density metal, which has better protection effect and better blocking effect on γ-rays, preventing mutual interference of detectors.

In a class of this embodiment, the plurality of ray detection assemblies is distributed layer by layer along an extension direction of the central through hole.

Each layer of the ray detection assembly implements total cross-section measurement of the fluid in the pipe, making the detection effect more accurate.

The following advantages are associated with the device for measuring a mass flow rate of a multiphase flow based on ray coincidence measurement of the disclosure.

First, the total cross-section measurement using the intrinsic rays of the scintillation crystal can not only eliminate the radioactive sources in the ray measuring device in the related art, but also lowers the cost of system and reduces the volume of the equipment, greatly improves the system safety and reliability. In addition, because the half-life of Lu-176 is $2.1 \times 10^{10}$ years, the equipment performance will not degrade caused by the aging of the radiation apparatus, which greatly improves the system stability and service life.

Second, the lutetium element scintillation crystal that can naturally emit γ-rays with three types of energy is used. Because the ratio of intensity of the naturally emitted γ-rays with three types of energy is inherent and constant that cannot be altered by humans and is not affected by any change in the external temperature and pressure, it brings great convenience and simplification to the solution of the flow formula of the disclosure. In addition, the constant temperature device used to keep the γ-ray receiver at a constant temperature can be eliminated, which simplifies the structure of the measuring device and makes the measuring device of the disclosure work conveniently and reliably in an underwater environment for a long time without worrying about the troubles for replacing the power supply and maintaining the constant temperature device, thus fundamentally eliminating the influence of temperature drift in the γ-ray measurement system, so the measurement result is more accurate.

DETAILED DESCRIPTION

To further illustrate, embodiments detailing a device for measuring a mass flow rate of a multiphase flow based on ray coincidence measurement are described below. It should be noted that the following embodiments are intended to describe and not to limit the disclosure.

Example 1

Figure 1:
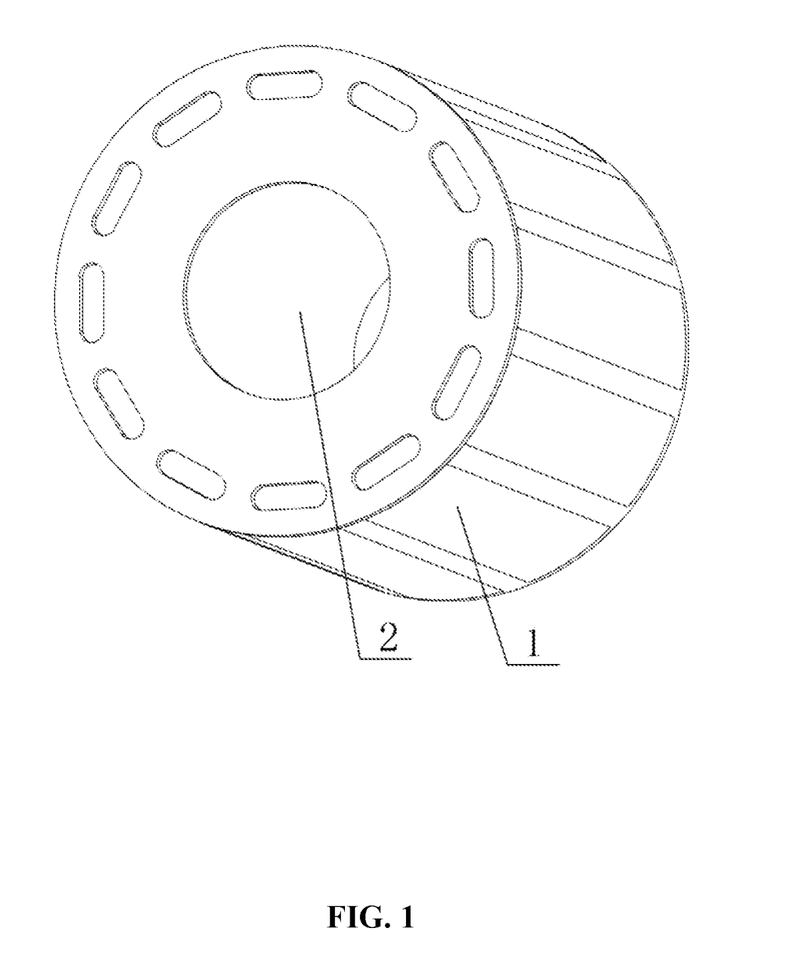
FIG. 1 is a schematic view of a device for measuring a mass flow rate of a multiphase flow based on ray coincidence measurement of Example 1.
Figure 2:
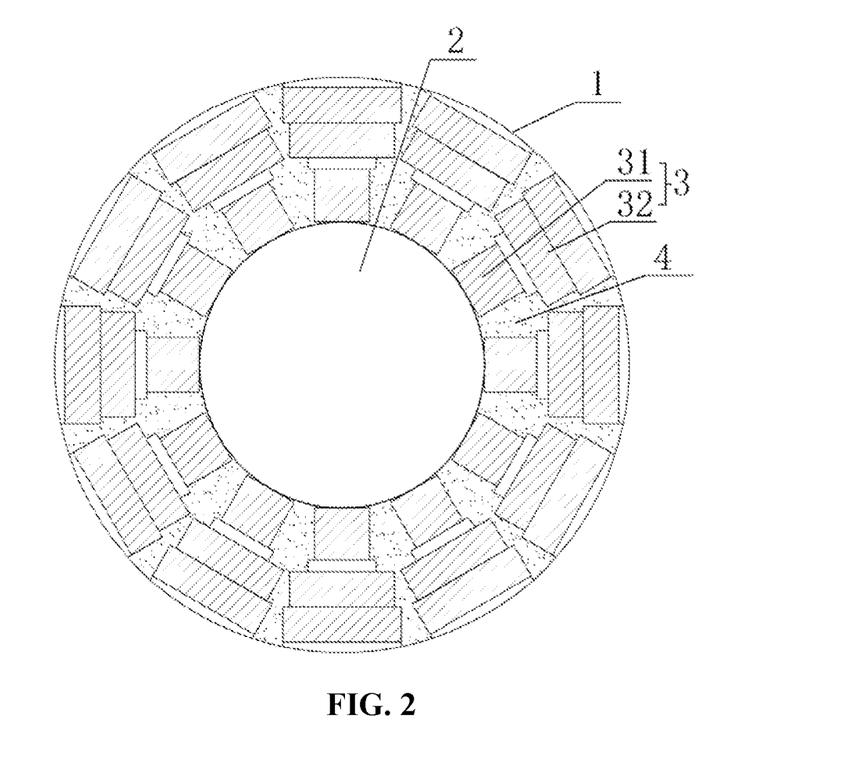
FIG. 2 is a cross section view of a device for measuring a mass flow rate of a multiphase flow based on ray coincidence measurement of Example 1.

Referring to FIGS. 1 and 2, a device for measuring a mass flow rate of a multiphase flow comprises a support frame 1. The support frame 1 comprises a central through hole 2 for the passage of a fluid pipe and an outer wall, and a plurality of ray detection assemblies 3 is disposed on the outer wall of the support frame 1. The plurality of ray detection assemblies 3 is distributed along the circumferential direction of the outer wall and is perpendicular to the axis of the central through hole 2; the plurality of ray detection assemblies 3 each comprises a scintillation crystal 31 and a detector 32, and the scintillation crystal 31 is disposed between the outer wall and the detector 32. One side of the scintillation crystal 31 abuts against the outer wall of the central through hole 2, and the other side is close to the detector 32.

The scintillation crystal 1, as a material often used in ray detection technology, are capable of converting high-energy γ-rays into low-energy fluorescence, which are then detected by photoelectric converters to convert into electrical signals. At present, commonly used scintillation crystals 31 include sodium iodide NaI, lutetium oxyorthosilicate (LSO), etc. Therefore, following this principle, based on the high-precision time measurement technique and the coincidence detection technique, the flight path of γ-rays, namely, the line of response, is obtained. Through a large number of lines of response, the corresponding imaging technologies such as the filter back projection technology, Ordered Subsets Expectation Maximization, etc., can be used to achieve the total cross-sectional measurement of the objects to be detected. By using the intrinsic rays of the scintillation crystal 31 to perform total cross-section measurement, the radioactive sources in the ray measuring device can be eliminated, to reduce the system cost with small volume, and greatly improve the system safety and reliability.

During use, the device for measuring a mass flow rate of a multiphase flow is mounted on the outer surface of an industrial fluid pipe. The pipe passes through the central through hole 2, and the ray detection assembly 3 performs total cross-section measurement and detection of the fluid in the pipe.

In this example, the scintillation crystal 31 comprises lutetium-176.

The lutetium element scintillation crystal contains Lu-176 radioactive isotope, which emits β-rays during the decay process, and the β-rays rapidly decay to produce γ-rays. Since the energy spectrum of Lu-176 is known, β-rays will be produced during the decay process, and the decay of the β-rays will produce three energy levels of γ-rays, that is, 307 keV, 202 keV, and 88 keV, respectively. Because of extremely weak penetration ability (1 micron), β-rays can be detected in the locality where they are generated, while γ-rays have relatively strong penetration ability, which can penetrate the fluid to be tested and then be detected. Therefore, according to this principle, the β-ray detection position can be used as the starting point of the γ-rays. After the corresponding γ-ray passes through the fluid pipe under test, it is detected by the detector 32 located at the corresponding position of the pipe, which is used as the destination point, thereby obtaining the flight path of the γ-rays. In addition, because the half-life of Lu-176 is $2.1 \times 10^{10}$ years, the equipment performance will not degrade caused by the aging of the radiation apparatus, which greatly improves the system stability and service life.

In this example, the scintillation crystal 31 is a sheet-like scintillation crystal. The sheet-like scintillation crystal LSO has a small volume and stable performance, with low cost.

In this example, the detector 32 is a photomultiplier tube.

The photomultiplier tube (PMT) is a traditional photoelectric conversion device with extremely high sensitivity and ultra-fast time response, which can quickly and effectively convert the optical signals of the rays into electrical signals; the photomultiplier tube, together with the modular circuit, amplifies the signals and reduced the noise, outputs the signal pulses. The signals are observed by an oscilloscope, and finally the collected waveform data are stored and analyzed by a host computer.

Figure 3:
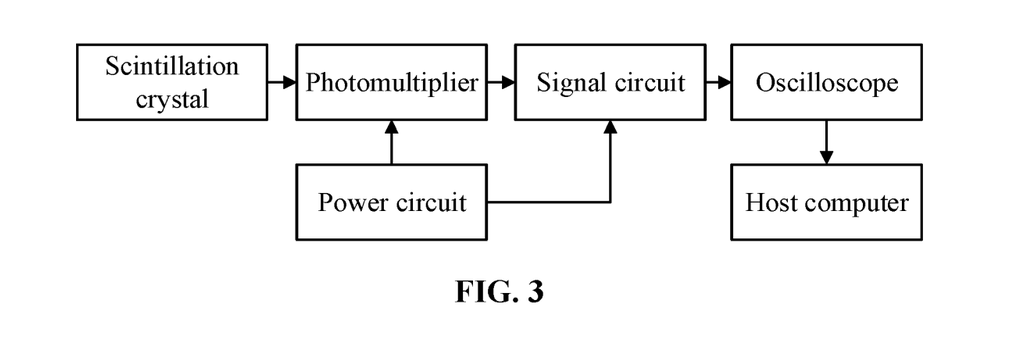
FIG. 3 is a schematic diagram of a device for measuring a mass flow rate of a multiphase flow based on ray coincidence measurement of Example 1.

As shown in FIG. 3, the modular circuit comprises a power supply circuit and a signal circuit. The power supply circuit provides power for the photomultiplier tube and the signal circuit. Generally, only a direct current within a reasonable range is sufficient, and an AC-DC power adapter can be used for power supply, or batteries can be used directly for power supply. The signal circuit mainly processes the pulse signals output by the photomultiplier tube. Since the amplitude of signals output from the photomultiplier tube 21 is very small, generally the signals need to be processed such as amplification, noise reduction, etc.

Since the power supply circuit and the signal circuit are some conventional design circuits, those skilled in the art can adopt them according to the actual needs, and the specific circuit diagrams are not disclosed in this example.

The scintillation crystal 31 is a high-density crystal. The surface of the detector 32 is provided with a layer of epoxy resin. When the light is emitted from the scintillation crystal 31 to the detector 32, it is emitted from an optically denser medium to an optically thinner medium. If air exists between them, total reflection easily occurs, causing light loss. Optical couplants, especially optical couplers, are transparent media with large refractive index. When couplants are disposed between the scintillation crystal 31 and the detector 32, the air can be effectively eliminated and the light loss caused by total reflection can be significantly reduced.

Therefore, in this example, the scintillation crystal 31 and the detector 32 are fixed by a couplant. The couplant may be a silica gel to bond the scintillation crystal 31 to the detector 32, effectively reducing the loss of light from the scintillation crystal 31 to the detector 32 and improving the photoelectric conversion efficiency.

In this example, every two adjacent ray detection assemblies 3 are isolated by a metal piece 4.

The metal piece 4 is capable of preventing rays emitted by a ray detection assembly 3 from being detected by other ray detection assemblies 3 before passing through the fluid pipe, thereby reducing mutual interference. The metal piece 4 is a tungsten-base alloy. The tungsten-base alloy is a high-density metal, which has better protection effect and better blocking effect on γ-rays, preventing mutual interference of detectors 32.

The material of the metal part 4 can also be lead, which is a conventional insulating metal and is inexpensive.

In this example, according to the shape of the pipe, the support frame 1 is designed as a cylinder, and the cylindrical through hole 2 fits the cylindrical pipe, so that the scintillation crystal 31 is close to the pipe, with better radiation and detection effect. A wiring channel 5 is disposed on the top of the support frame 1, to lead out the power line of the detector 32.

The working principle of the device for measuring a mass flow rate of a multiphase flow of the example is as follows. The device is mounted on the outer surface of the fluid pipe, and the scintillation crystal 31 is aligned with the fluid pipe for detection. The scintillation crystal 31 decays to generate β-rays, which are detected by the detector 32 adjacent to the scintillation crystal 31; at the same time, the γ-rays generated by the decay of β-rays pass through the fluid pipe and are detected by the measuring device on the other side of the pipe.

The scintillation crystal 31 converts rays into photons, the photomultiplier tube 21 converts light signals into electrical signals, and the modular circuit 22 implements processing of the electrical signals such as amplification and noise reduction, etc. before outputting. An oscilloscope is provided to observe or convert the signals, and finally the collected waveforms are stored and analyzed and the mass phase fraction of the fluid is calculated by a host computer.

In this example, by using the intrinsic rays of the scintillation crystal 31 to perform total cross-section measurement, the radioactive sources in the ray measuring device can be eliminated, to reduce the system cost and greatly improve the system safety and reliability. In addition, because the half-life of Lu-176 is $2.1 \times 10^{10}$ years, the equipment performance will not degrade caused by the aging of the radiation apparatus, which greatly improves the system stability and service life.

Example 2

The difference between this example and Example 1 is that the sheet-like scintillation crystal is replaced with a plastic scintillation crystal.

The content of Lu-176 in the sheet-like scintillation crystal LSO is low, which reduces the number of emitted rays of the system and affects the defection efficiency. The plastic scintillation crystal LYSO has better light amplification performance, short light emission time, faster amplification, higher detection efficiency, which is easier to be detected; furthermore, the plastic scintillation crystal LYSO is not easy to deliquesce and has a longer service life.

Example 3

The difference between this example and Example 1 is that the photomultiplier tube is replaced with a silicon photomultiplier 32.

The silicon photomultiplier (SiPM) is a detector. After the photons are absorbed, a current is generated in the SiPM and multiplied, which can output a larger current signal and can be received by the modular circuit. In this example, the detection efficiency of γ-rays is higher and the volume is smaller.

Example 4

Figure 4:
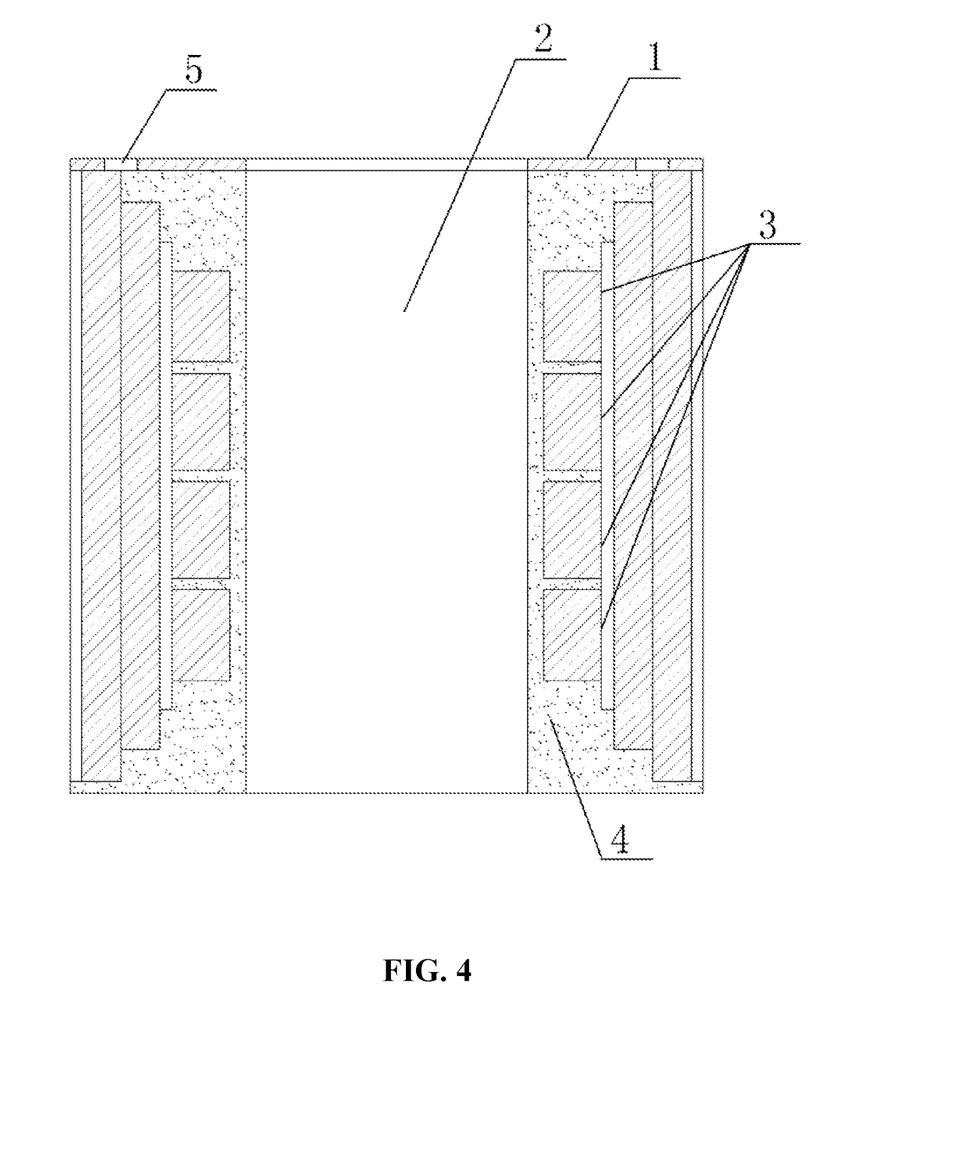
FIG. 4 is a longitudinal section view of a device for measuring a mass flow rate of a multiphase flow based on ray coincidence measurement of Example 4.

As shown in FIG. 4, the difference between this example and Example 1 is that four layers of the ray detection assemblies 3 are distributed along the extension direction of the central through hole 2. Each layer of the ray detection assembly 3 measures the total cross-section of the fluid in the pipe, thus improving the accuracy of the detection.

Example 5

Figure 5:
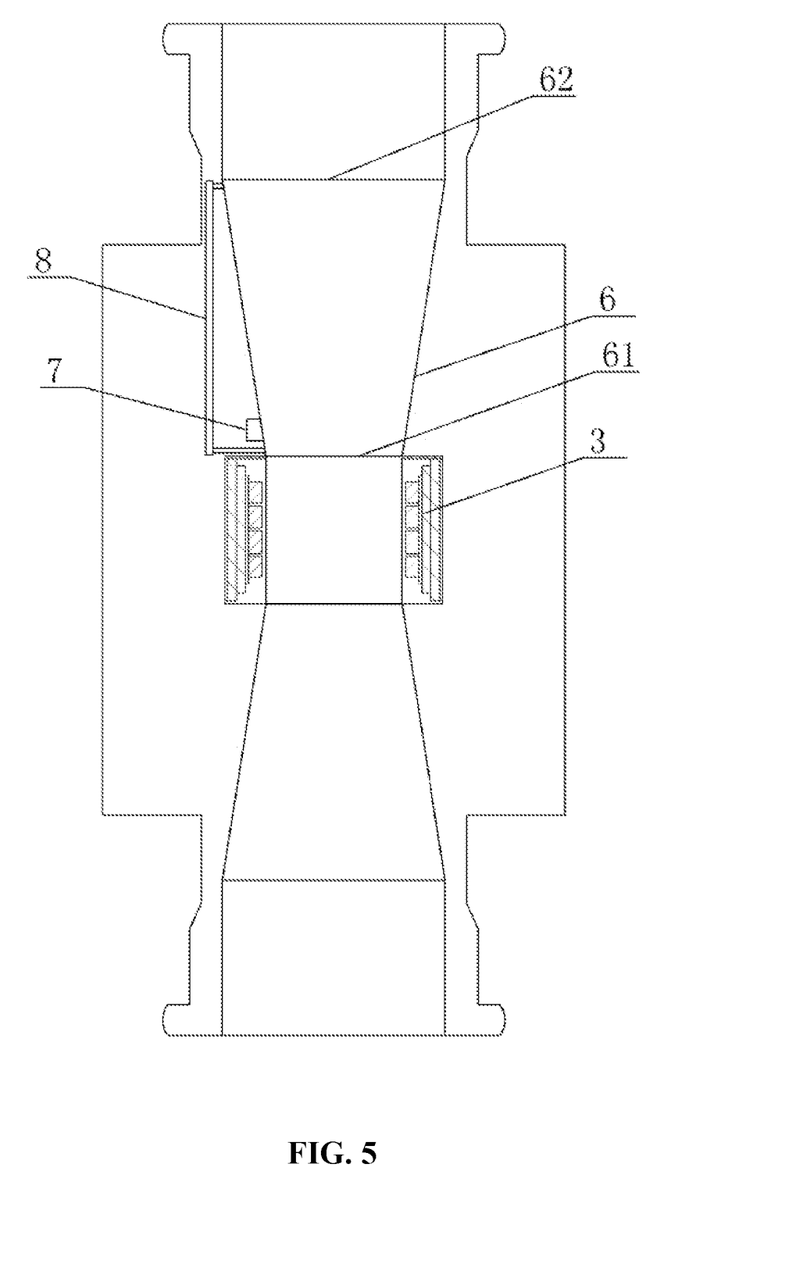
FIG. 5 is a schematic view of a differential pressure type flowmeter of Example 5.

This example provides a method for measuring a mass flow rate of a multiphase flow using the device described in the above examples. As shown in FIG. 5, the measuring device is mounted in conjunction with a differential pressure type flowmeter 6 comprising a throat section 61, and the measuring device is mounted outside the throat section 61.

The basic principle of the differential pressure type flowmeter 6 is as follows. In a circular pipe filled with fluid, a throttling device such as a venturi, an orifice plate or a nozzle are disposed, and the position with the smallest diameter is called a throat. When the fluid flows through the throttling device, a static pressure difference is generated between its upstream and the throat. There is a fixed functional relationship between the static pressure difference and the flow rate. As long as the static pressure difference is measured, the flow rate can be obtained from the flow formula.

The measuring device is mounted such that the γ-rays emitted by the scintillation crystal 31 pass through the throat section 61 along the diameter direction and are received by the detector 32 on the other side. Since the energy spectrum of Lu-176 is known, β-rays will be produced during the decay process, and the decay of the β-rays will produce three energy levels of γ-rays, that is, 307 keV, 202 keV, and 88 keV, respectively. Therefore, this example does not need to use a constant temperature device.

The differential pressure type flowmeter 6 further comprises a temperature and pressure sensor 7 for measuring the temperature and pressure of the fluid and a differential pressure sensor 8 for measuring the pressure difference between the inlet 62 of the differential pressure type flowmeter 6 and the throat section 61.

In this example, the differential pressure type flowmeter 6 is a Venturi flowmeter.

In this example, the flow of industrial fluids is measured as follows:

1) Measuring the fluid temperature T by the temperature and pressure sensor 7, measuring the pressure difference ΔP between the inlet 62 of the differential pressure flowmeter 6 and the throat section 61; and measuring the transmission intensities of three γ-rays (namely, Nx1, Nx2 and Nx3) by a measuring device;

2) Calculating the total mass flow rate of the fluid and the respective mass flow rate of the gas and liquid phases according to the following formula:

Total mass flow rate:

$$Q_m = \frac{C}{\sqrt{1-\beta^4}} \varepsilon \frac{\pi}{4} D^2 \sqrt{\Delta P \rho_{mix}};$$

where, C is an outflow coefficient of the throttling flowmeter; ε is a fluid compression correction factor; β is a diameter ratio of the throttling flowmeter; D is a thickness measured by gamma ray, i.e., the pipe diameter; ΔP is a pressure difference, i.e., the measured value.

$\rho_{mix}$ is an average areal density of the fluid on the measured cross section. In this example, $\rho_{mix} = \rho_l \eta_l + \rho_g (1-\eta_l)$;

Liquid mass flow rate: $Q_l = Q_m \eta_l$;

Gas mass flow rate: $Q_g = Q_m (1-\eta_l)$;

$\eta_l = \Sigma(Xi/D * \eta i)/\Sigma(Xi/D)$;

$\eta_l$ is the phase fraction of the two-phase fluid, D is the distance between the two scintillation crystals 31 farthest apart (if the pipe is cylindrical, then D is the diameter), ηi is the measured percentage content of the liquid in the two-phase fluid of each scintillation crystal 31, Xi is the distance between a first scintillation crystal 31 that emits γ-rays and a second scintillation crystal 31 that receives γ-rays.

It will be obvious to those skilled in the art that changes and modifications may be made, and therefore, the aim in the appended claims is to cover all such changes and modifications.

What is claimed is:

1. A device for measuring a mass flow rate of a multiphase flow in a fluid pipe, comprising a support frame and a plurality of ray detection assemblies; wherein:
    the support frame comprises a central through hole and an outer wall, and the central through hole is configured to receive the fluid pipe;
    the plurality of ray detection assemblies is distributed along a circumferential direction of the outer wall and is perpendicular to an axis of the central through hole; wherein each detection assembly is disposed opposite to one another detection assembly along the diameter of a cross section of the central through hole, wherein the cross section of the central through hole is perpendicular to the axis of the central through hole;
    the plurality of ray detection assemblies each comprises a scintillation crystal and in each detection assembly, the scintillation crystal is adjacent to the detector, the scintillation crystal is adapted to abut against an outer wall of the fluid pipe, and the scintillation crystal is adapted to be disposed between the outer wall of the fluid pipe and the detector;
    the scintillation crystal comprises lutetium-176, and the scintillation crystal is adapted to emit a β-ray during the decay of lutetium-176 and emit a γ-ray generated by the decay of the β-ray; wherein the γ-ray is adapted to pass through the multiphase flow in the fluid pipe along a diameter of the cross section of the central through hole to be detected, for the purpose of obtaining image data in the multiphase flow; and
    the detector of each detection assembly is adapted to receive the β-ray emitted by the scintillation crystal in the each detection assembly; and the detector of the each detection assembly is adapted to receive the γ-ray emitted by the scintillation crystal of the detection assembly opposite to the each detection assembly.

2. The device of claim 1, wherein the scintillation crystal is in a sheet shape and is plastic.

3. The device of claim 1, wherein the detector is a photomultiplier tube or a silicon photomultiplier.

4. The device of claim 1, wherein the scintillation crystal and the detector are fixed to each other by a couplant.

5. The device of claim 4, wherein the plurality of ray detection assemblies is distributed layer by layer along an extension direction of the central through hole.

6. The device of claim 1, wherein every two adjacent ray detection assemblies are isolated by a metal piece.

7. The device of claim 6, wherein the metal piece is a tungsten-base alloy.

8. The device of claim 7, wherein the plurality of ray detection assemblies is distributed layer by layer along an extension direction of the central through hole.

9. The device of claim 6, wherein the plurality of ray detection assemblies is distributed layer by layer along an extension direction of the central through hole.

10. The device of claim 1, wherein the plurality of ray detection assemblies is distributed layer by layer along an extension direction of the central through hole.

* * * * *